March 24, 1925.
W. H. PAULL
PNEUMATIC TIRE
Filed Sept. 3, 1924
1,530,574
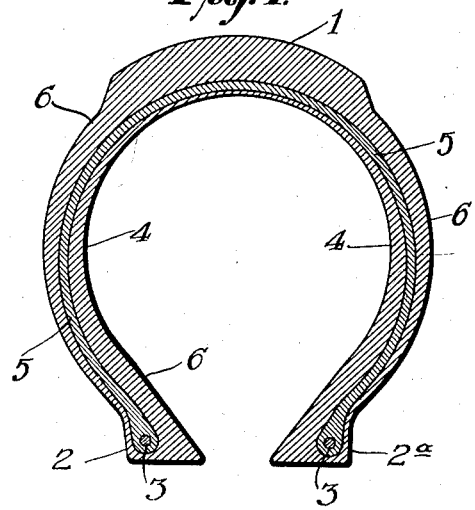
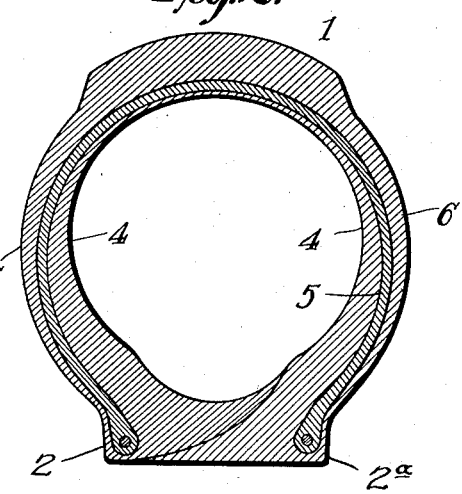
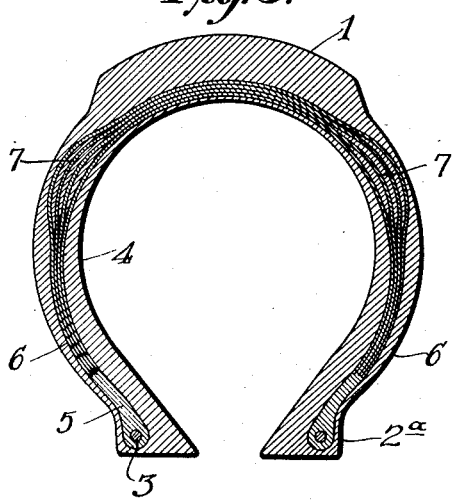
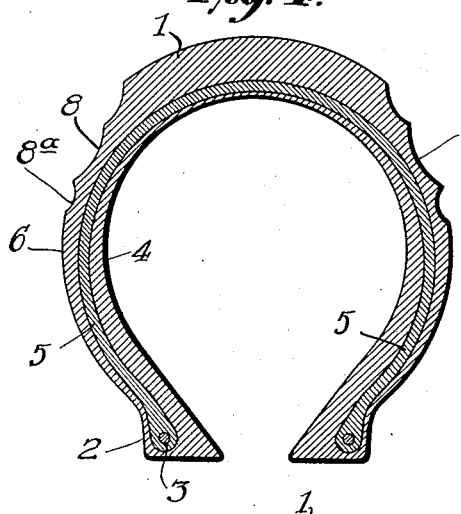
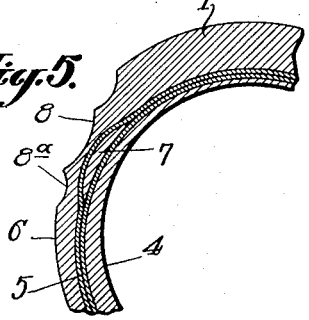
Inventor
WALLACE HENRY PAULL.
By His Attorney Patented Mar. 24, 1925. 1,530,574

UNITED STATES PATENT OFFICE.

WALLACE HENRY PAULL, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

PNEUMATIC TIRE.

Application filed September 3, 1924. Serial No. 735,698.

*To all whom it may concern:*

Be it known that I, WALLACE HENRY PAULL, a subject of the King of Great Britain, residing in Birmingham, in the county of Warwick, England, have invented certain new and useful Improvements in Pneumatic Tires, of which the following is a specification.

Pneumatic tires consist essentially of an inner inflatable tube and an outer cover, which outer cover is so constituted that when attached to its retaining rim it is capable of restraining air pressure and is adapted to carry the outer protective covering of rubber which protects the air tube and takes up the abrasive wear due to frictional contact with the road surface.

In the manufacture of pneumatic tire covers it has hitherto been customary to build up a casing of two or more plies of cotton cloth, fabric or cord thinly coated with rubber to effect their adhesion and to affix to the outer surface of such casing a protective covering of rubber of suitable shape and thickness at its centre to form the tread or wearing portion, and to mould to shape and vulcanize such covers in suitable moulds.

In practice the life of a tire so constructed depends largely upon the ability of the textile fabric of which the casing is formed to resist the flexing to which it is subjected as each portion of its circumference successively comes under load and is released therefrom as the tire revolves. In order to minimize such flexing it has been customary in some cases to maintain relatively high fluid pressures within the tire and in other cases to increase the sectional dimensions and reduce the thickness of the casing. Such high inflation pressures as are necessary to enable the tires to support the loads they are called upon to carry with the smallest amount of deflection practicable, seriously reduce the cushioning properties of the tires. On the other hand, tires having increased sectional dimensions with thin casings although they permit reduced inflation pressures and minimize the damaging effects of flexing, offer serious disadvantages in other respects.

The object of this invention is to produce a tire in which the damaging and destructive effects of flexing upon the casing are greatly reduced, the carrying capacity maintained and the cushioning value increased, without any of the disadvantages of tires having largely increased section and specially thin walls.

According to this invention I produce such a tire by so disposing the textile component of the tire cover that it lies at or near the outer surface of the cover walls at or near its edges and at or near to the inner surface thereof at the centre.

In some cases I insert insulated rubber of graduated thickness between the plies at and about the points of maximum flexing and I sometimes employ rubber of extra thickness at the edges of the cover so disposed as to form a cushion when the tire becomes deflated. I may also provide circumferential grooves in the outer rubber covering at and about the points of maximum flexing to facilitate stretching of the outer surface at those points.

According to the preferred method of carrying my invention into practice I construct a tire casing of rubber and textile material, which textile material may be in the form of a woven canvas, a woven cord, a weftless cord or even in the form of combed or carded slivers of suitable fibres impregnated with rubber but instead of arranging my textile material at the inner surface of the tire cover as has hitherto been the practice, so that the inner layer thereof lies concentric with and immediately surrounds the air tube, I build up my improved cover with the textile component disposed eccentrically to the wall of the inflated tube so that the portion of the textile component lying under the tread of the tire forms the inner surface of the cover and those portions at the sides and base portions thereof lie near its outer surface.

The internal surface of the tire cover is preferably of approximately circular form in which case the disposition of the textile component as described will form an arc the radius of which is greater than that of the tire cover itself.

Such an arrangement provides a tire cover having walls of approximately even thickness except at the tread portion where an additional thickness of rubber may be added to provide for tread abrasion. Such tires or tire covers are preferably of the same sectional dimensions having regard to the load to be carried, as the high pressure tires heretofore in common use, although they may be slightly larger.

The effect of such construction is to prevent the crushing of the inner plies of the textile walls on flexing. It is the inner rubber face of the cover walls which in my improved construction sustains the crushing due to flexing.

In some cases I modify the structural arrangement in such a manner that whilst retaining the approximate circular internal shape, the thickness of the rubber walls at and about the sides nearest the rim is increased substantially, thus resulting in a widening of the base of the arch formed by the textile component.

The extreme inner rubber edges of the cover walls may, if required, be sufficiently prolonged to enclose or nearly enclose the tube when in position on the rim.

In assembling the textile component, I sometimes apply a suitable insulation of rubber between the various plies of textile material, preferably increasing the thickness of such insulation at and about the points of the tire wall which when in use are subject to the greatest flexing movement.

I sometimes form circumferential grooves or recesses in the outer rubber surface of the cover at and about the points where the maximum degree of flexing takes place, in order to facilitate the stretching of the outer surface with lessening of the resultant crushing stresses on the inner plies of the casing.

In the accompanying drawings, Fig. 1 shows in cross-section a tire cover constructed according to one form of my invention.

Fig. 2 shows in cross-section a modification in which the rubber walls at and about the base and sides of the cover are considerably increased in thickness and prolonged to provide a cushion in case of deflation;

Fig. 3 shows in cross-section a modification in which rubber insulation of graduated thickness is used between the plies of the textile component at and about the points of maximum flexing;

Fig. 4 shows in cross-section the formation of a groove or grooves in the outer surface at and about the point of maximum flexing;

Fig. 5 is a cross-section of a fragment of a tire combining the distinctive features of Figs. 3 and 4.

Referring to the drawings, 1 is the tread portion, 2 and 2ª are the edges of the cover which may be provided with inextensible wire rings, 3, or alternatively with hooked moulded beads or with other suitable forms of attachment for securing the tires upon the rims.

4 is the inner surface of the tire cover and is approximately circular in section;

5 is the textile component passing from the wires or beads through the outer surface at or near the outer surface of the cover gradually passing to the inner surface below the tread portion.

6 is the rubber portion of the cover walls.

7 (Fig. 3) is the rubber insulation of graduated thickness between the plies of the textile component at and about the points of maximum flexing.

8 and 8ª (Fig. 4) are grooves in the outer rubber surface at and about the points of maximum flexing.

The improvement of Figs. 3 and 4 may both be applied to the same tire. In Fig. 5, for example, I have illustrated the graduated rubber insulation 7 between the plies of textile material, and the outer surface grooved at 8 and 8ª, at about the points of maximum flexing.

Tires constructed according to this invention and run under lower air pressures have a greater cushioning capacity than ordinary tires run under higher air pressures commonly used.

Moreover in their construction it is possible to considerably reduce the amount of the textile component of the cover without increasing its sectional dimensions. Such reduction may be made either in the number of plies, or by the substitution of a lighter material.

It is a common expedient in tire shoes to have the edges of the reinforce pass around the outside of wires or beads which are imbedded in the edges of the tire; and thus the edges of the reinforce are spread to the outer surface of the tire. But, as far as I am aware, the middle portion of the reinforce (extending, say, from the beads or from the extreme right-hand and left-hand points of the cross-section around through the tread portion) has been substantially or approximately parallel to the inner surface of the tire. In my tire, on the contrary, this middle portion of the textile component is eccentric to the inner surface of the tire in cross-section. And, as will appear from the drawing, there is a gradual approach of the textile component toward the inner surface, commencing beyond the beads and working continuously toward the center of the tread portion.

Having now particularly described and ascertained the nature of my said invention and in what manner the same is to be performed, I declare that what I claim is:

1. A pneumatic tire cover having a textile component and a rubber component, the middle portion of the textile component disposed within the corresponding portion of the rubber component eccentrically to the inner surface of the tire.

2. A pneumatic tire cover having a textile component and a rubber component, the cross-section of the tire having the textile component so disposed that near the edges of the cover it lies near the outside surface of the cover and so that it gradually approaches the inner surface of the cover from such edges continuously to the center.

In witness whereof, I have hereunto signed my name.

WALLACE HENRY PAULL.